US012795372B2

(12) United States Patent
Khrabryi

(10) Patent No.: US 12,795,372 B2
(45) Date of Patent: Nov. 10, 2026

(54) SYSTEM AND METHOD OF MUTUAL AUTHENTICATION OF GROUP-BASED DEVICES

(71) Applicant: Aleksandr Khrabryi, Princeton, NJ (US)

(72) Inventor: Aleksandr Khrabryi, Princeton, NJ (US)

( * ) Notice: Subject to any disclaimer, the term of this patent is extended or adjusted under 35 U.S.C. 154(b) by 203 days.

(21) Appl. No.: 18/623,798

(22) Filed: Apr. 1, 2024

(65) Prior Publication Data

US 2024/0244049 A1 Jul. 18, 2024

(51) Int. Cl.

| | |
|---|---|
| ***H04W 12/50*** | (2021.01) |
| ***H04L 9/08*** | (2006.01) |
| ***H04L 9/32*** | (2006.01) |
| ***H04W 12/55*** | (2021.01) |
| *G06V 40/16* | (2022.01) |
| *G06V 40/20* | (2022.01) |
| *H04L 9/40* | (2022.01) |
| *H04W 12/06* | (2021.01) |

(52) U.S. Cl.

CPC ........... *H04W 12/50* (2021.01); *H04L 9/0869* (2013.01); *H04L 9/3273* (2013.01); *H04W 12/55* (2021.01); *G06T 2207/10016* (2013.01); *G06T 2207/30201* (2013.01); *G06T 2207/30241* (2013.01); *G06V 40/172* (2022.01); *G06V 40/20* (2022.01); *H04L 63/0861* (2013.01); *H04W 12/06* (2013.01)

(58) Field of Classification Search

None

See application file for complete search history.

(56) References Cited

U.S. PATENT DOCUMENTS

| | | | | |
|---|---|---|---|---|
| 2003/0109300 | A1* | 6/2003 | Walker | G07F 17/32 463/21 |
| 2005/0081006 | A1* | 4/2005 | Shackelford | G06F 11/2069 711/170 |
| 2009/0125370 | A1* | 5/2009 | Blondeau | G06Q 10/0633 706/12 |
| 2018/0248873 | A1* | 8/2018 | Loreskar | H04L 9/321 |
| 2020/0127827 | A1* | 4/2020 | Singh | G06F 16/29 |
| 2021/0352434 | A1* | 11/2021 | Harvey | G01S 13/765 |
| 2024/0070251 | A1* | 2/2024 | Maizels | G06F 21/32 |
| 2024/0073219 | A1* | 2/2024 | Maizels | G10L 13/00 |
| 2025/0054120 | A1* | 2/2025 | Ming | G06T 7/00 |

FOREIGN PATENT DOCUMENTS

| | | | | | |
|---|---|---|---|---|---|
| CN | 106791364 | A | * | 5/2017 | H04N 23/611 |
| CN | 111475791 | B | * | 1/2023 | G06V 40/171 |
| JP | 6131907 | B2 | * | 5/2017 | H04M 3/51 |
| TW | 1628611 | B | * | 7/2018 | G06F 3/14 |

* cited by examiner

*Primary Examiner* — Ali H. Cheema

(57) ABSTRACT

A system and method to assign exactly one source to each device within a group of devices and mutual authentication of owners of these devices is described herein. In an implementation, the method comprising steps of creating a sequence of the devices within the group of devices, looping the sequence of the devices in a manner that a first device follows a last device within the group of devices, collectively generating a random integer that is not equal to a number of devices within the group of devices, assigning a source device to said each device based on the collectively generated random integer, and performing, by said each device, said mutual authentication with the assigned source device and all other devices within the group of devices.

6 Claims, No Drawings

SYSTEM AND METHOD OF MUTUAL AUTHENTICATION OF GROUP-BASED DEVICES

FIELDS OF THE INVENTION

The present invention relates to the field of user authentication based on the detection of liveliness, and to the areas of ensuring network security and secure remote electronic voting by preventing spoofing attacks using figureheads and objects masquerading as people.

BACKGROUND OF THE INVENTION

The task of providing access to the voting process only to those persons who were previously registered, that is, entered into the database, while excluding the possibility of their substitution, is one of the most important tasks that are solved during voting.

A natural way of authentication is the traditional method of verifying the identity documents presented by the voter. This method is reflected in the following group of patents.

Methods of Admission to Voting on a Document and Data in the Database

In patent US20230083852A1 with priority dated Nov. 14, 2022, the inventors of which are Abdelkader M'hamed, Benkreira Joshua Edwards, Michael Mossoba, proposes a system that verifies the identity of a voter. This system, firstly, compares a selfie image of his face and a photo in a document certifying his identity, secondly, recognizes data objects and symbols in this document using OCR and computer vision, and based on the results of this recognition identifies the type of document and calculates the validity index of this document.

Displays the user's confidence status, guided by predefined thresholds, based on the correspondence of images and the validity index (pending).

In patent US20220138298A1 with priority dated Nov. 5, 2021, the inventors of which are Simon Law, Pasan Chankama Hapuarachchi, Phillip L. Kumnick, Thomas R. Szoke, Maxim Umarov, proposes a system that verifies the identity of a voter by comparing images of his face (for example, a selfie photo) and a scanned photo in a document certifying his identity. Based on the results of this comparison, guided by predefined thresholds, it determines the user's confidence status. Uses Fast Identity Online (FIDO) (in waiting).

Patent US20210294880A1 with priority dated Mar. 24, 2018, the inventors of which are Vasilis Polychronidis, Adarbad Master, Michal Kepkowski, proposes a system for confirming the user's reality by scanning the documents and/or biometric data presented by them and comparing them with available public and private databases. A process can assign a score to each verified item, which is then calculated into a total confidence score that is available to other processes for approving transactions. Digital identification is combined with mobile phone credentials to create a reusable identification token.

Patent US20230177508A1 with priority dated May 18, 2020, the inventor of which is Rikesh Ram, proposes a method and system for biometric authentication(s) without requesting any personal information or device from the user(s). The system includes a registration module that allows the user(s) to register in the system. The input module receives registration information from the user(s), and the machine learning module compensates for blurring and poor image in the registration information. The verification module registers the user and creates a record, checking the registration information with the authority that issued the document. The liveliness detection module scans the user's face and creates a 3D map of his face in real time. The authentication module authenticates the user's identity by searching for a matching record based on face scans and saved records. The 3D face card is deleted after authentication.

Patent US20210105271A1 with priority dated Sep. 28, 2020, the inventors of which are Jay Nitturkar, Erika Eördögh, proposes systems, devices and methods of multi-factor identity verification aimed at use in healthcare, which include automatic acquisition of a selfie image and cross-matching of address information, biometric data on geographical location, as well as unique smartphone identifiers.

Patent US20230316790A1 with priority dated Mar. 30, 2022, the inventors of which are Lukas Bayer, Can Wang, Dayron Rizo Rodriguez, Jason Richard Taylo, proposes a method for detecting fraud when a user sends an image of an identity card with a photo and a selfie taken during the verification process. The machine learning model can determine biometric data from selfies (for example, estimated age, gender, hair and eye color, etc.). The decision is made on the basis of comparing the biometric data obtained from the selfie with the biometric data of the photo ID (pending).

U.S. Pat. No. 11,688,194B2, the application for which was filed on Apr. 22, 2020, the inventor of which is Sébastien Bahloul, proposes a method for authenticating an identity document based on extracting by analyzing an image obtained from an identity document, a photograph and optically readable data and comparing them with a photograph and similar data stored in a database in encoded form.

U.S. Pat. No. 11,722,306B2, filed on May 19, 2020, and whose inventor is Sébastien Bahloul, proposes a user authentication system consisting of a server and a connected client device that contains the user's biometric data and an image of the user's identity document. The method proposed in the patent consists of two comparisons: comparing the user's biometric data with the data in his document and comparing this data with the data stored in the database in encoded form (according to the procedure described in the patent U.S. Pat. No. 11,688,194B2).

An alternative way to determine who is eligible to vote is to create specific computer- based identification tools. Various schemes for allowing voters to vote using such means are formulated in the following patents.

Alternative Methods of Identity Verification

The system claimed in patent US20170109955A1 with priority dated Oct. 19, 2016, the inventors of which are Adam Ernest, Nathan Hourt, Daniel Larimer, which includes an election administrator module, a voter module, a voter ID server, a registrar server for separating identification information from a voter's public key, a hidden token for voter registration and a blockchain for data storage about elections and decisions of voters, provides for the identification of the voter by the ID server first (using a webcam), which ends with the creation of a hidden voter token on its module, and then verification by the token registration server during voting.

U.S. Pat. No. 9,652,920B2 with priority dated Jul. 3, 2013, the inventor of which is Lao Chen, proposes to conduct voting using intelligent mobile communication devices. The server module is used to store information about the voter, verify the registration and identity of the voter, issue and verify the voting certificate. The server module, upon request of the client module for a voting certificate, after accumulating a predetermined number of such requests and verifying them, creates such certificates using asymmetric encryption keys and issues them to voting devices in random order U.S. Pat. No. 10,979,225B1 with priority dated Nov. 15, 2018, the inventors of which are Trupti Shiralkar, Joshua Stevens, proposes a system where a homomorphically encrypted digital signature of a voter and a voting access token are verified by several devices, and the device's right to vote is confirmed by its hash value, based at least partially on a unique hardware the identifier of this device and its type.

U.S. Pat. No. 11,323,262 dated Mar. 3, 2019, the inventor of which is Paul Zawierka, proposes a method and system for verifying a voter using a blockchain, which boils down to receiving several devices of voter identification information associated with his account and verifying this information for compliance with the requirements of the organizer of the vote. The voter's identification information, including biometric data and signature, is stored in a block of the blockchain, being divided into two parts, one of which is encrypted. When several devices receive a request to vote from a voter's account, they get access to his account and check this record for the right to vote and whether it has already voted.

All of these and similar inventions did not take into account the problem of voter substitution, which is provided by the possibility of copying, unauthorized use or forgery of files that confirm the identity of the voter.

The task of excluding bots was reduced to developing ways to verify the authenticity of the subject who applied to participate in the vote by presenting a certificate, token or password. In solving this problem, various ways were found to confirm that the application was submitted by a living person

Methods Using Signs Unrelated to Human Reaction

U.S. Pat. No. 11,093,770B2 with priority dated Dec. 31, 2018, the inventors of which are Stephen Miu, Yecheng Wu, provides for determining the user's reality from several frames with an image of his face, allowing to establish the three-dimensionality of the observed object based on an analysis of the correspondence of the naturalness of the illumination of the user's face with several light sources acting according to predetermined lighting patterns.

Patent US20210264183A1 (now U.S. Pat. No. 11,488,419B2) with priority dated Feb. 19, 2021, the inventors of which are Jeffrey James Wolf, Michael James Smith, Christopher J. McClellan, Matthew Francis Keller, Evan Robert Thompson, Johnathan David MacGregor, provides for the definition of user reality based on the analysis of the correspondence of two simultaneous images: an IR image and a color image images of the user's face.

In U.S. Pat. No. 11,134,079B2 with priority dated May 21, 2019, the inventors of which are Sarbajit K. Rakshit, Martin G. Keen, James E. Bostick, John M. Ganci, Jr., provides for determining the user's reality from several digital images, in which the current field of view of a computing device is revealed, from which the computer determines the user's current location and his current pose, and determines whether at least one of the checked—current field of view, current location and current pose—corresponds to one or more of the user's previous field of view, the user's previous location, and his previous pose during the previous authentication.

Methods Using Signs Related to Human Behavior

The patent EP3332403B1 with priority dated Aug. 10, 2016, the inventors of which are Benjamin Robert TREMOULHEAC, Georgios PARASKEVAS, Francisco Angel Garcia RODRIGUEZ, Symeon NIKITIDIS, Thomas BASTIANI, Miguel FERNANDO JIMENEZ SOLA, Usan Mahmood KHAN, proposes detecting the user's reality during a video selfie by correlating the user's appearance visible by the device and changing the positions of the device, fixed by sensors built into it.

In U.S. Pat. No. 9,230,158B1 with priority dated Dec. 18, 2012, the inventor of which is Sharadh Ramaswamy, it is proposed to identify by the time sequence of user images taken by the user's computing device (for example, a smartphone or tablet) its unreality due to the absence of changes: in the skin color of the face, in the features of the human face when turning or moving the camera, in reflections in the eyes caused by the lighting device, in the shadows in the image, etc.

U.S. Pat. No. 10,990,808B2 with priority dated Feb. 8, 2017, the inventors of which are Fang Hua, Taras Riopka, in order to confirm the authenticity and liveliness of the user, provides for an analysis of the dynamics of changes in his video image reflecting his characteristic features (for example, gait).

U.S. Pat. No. 11,330,012B2 with priority dated Nov. 5, 2020, the inventor of which is Avi Turgeman, proposes a method for using a personal device for a user's video selfie, while an accelerometer, gyroscope or orientation sensor of the device recognizes and measures the spatial and physical parameters of the device during, before or after sending a self-filmed video. Based on these parameters, combined with an analysis of the background on the captured video, the system determines the user's activity and the freshness of the presented video, which allows you to distinguish a legitimate user from an attacker.

In patent EP3282390B1 with priority dated Jul. 28, 2017, the inventor of which is Mircea Ionita, a method for determining the user's reality is proposed based on comparing the generated and real changes in the parameters of his image (which in the example described by the inventor are the distances between the points of the selfie image) when changing the tilt of the user's head and the smartphone with which he takes a selfie.

The above inventions retain the possibility of replacing a voter with a figurehead who provides identification files of the replaced voter (or any other user).

The need to exclude such a possibility led to the principle of using human reaction. According to this principle, it is necessary to create conditions in the authentication process under which a parameter inseparable from a person (for example, his appearance) changes under unpredictable (third-party) influence. The fact that this change occurs in accordance with this impact ensures that the person authenticating is indeed who he claims to be. This principle is implemented in a variety of solutions.

Methods Using Signs Related to the Reaction To External Influences

U.S. Pat. No. 9,940,532B2 with priority dated December 29, 2015, whose inventors are Haoqiang Fan, Kai Jia, Qi Yin, proposes a method involving authentication based on recording changes in the user's image that reflect changes in the color or brightness of the identification image presented to the user during the process authentication. Analysis of the correlation of the rhythm of these changes.

U.S. Pat. No. 10,637,853B2 with priority dated Aug. 5, 2016, the inventor of which is Rolf Lindemann, in the authentication process additionally provides for the presence of a module in the identifier that records changes in the size of the user's pupils under the influence of changes in the light intensity of the screen and a voice recognition module to determine the correlation between the recorded sound of the user's voice and his voice prints.

Patent US20220245963A1 dated Jun. 17, 2020, the inventors of which are Hugo Embrechts, Gonzalo Bailador, Dimitri Torfs, proposes a device method and a computer program for user authentication. The method includes offering the user to perform a facial gesture, video recording of this gesture, comparing the micro-movements of the user's facial features during the recorded facial gesture with a user-specific reference micro-movement pattern for a specific facial gesture. (Pending)

U.S. Pat. No. 10,339,402B2 dated Aug. 17, 2016, the inventors of which are Kai Jia, Qi Yin, proposes a method and device for detecting activity, including: generating a sequence of random action instructions, sequentially sending instructions in a sequence of arbitrary action commands; and determining whether this sequence is consistently performed by the user using at least two sensors, image sensor and non-image sensor.

Patent US20230306789A1 with priority dated Mar. 25, 2022, the inventor of which is Spandana Vemulapalli, proposes a way to confirm the user's reality by revealing in his video image how the direction of the user's gaze changes when the user executes instructions on head movement. (Waiting)

In patent US20230306792 dated May 30, 2023, the inventors of which are Spandana Vemulapalli, Reza R. Derakhshani, a method and device for Detecting the user's reality during the acquisition of an image of his face are proposed, while the user is instructed several times to give a particular expression to the face, and it is determined how much the resulting image corresponds to the template image of this facial expression from this user. (Pending)

U.S. Pat. No. 10,896,248B2 (US20180157815A1) with priority dated Jan. 23, 2018, the inventors of which are Hisham I. Salama, Paul Mon-Wah chan, Dino D'Agostino, Orin Del Vecchio, proposes method and system of user authentication is proposed based on his ability to indicate on the touch screen the sequence of parts of the image of his face given to him.

U.S. Pat. No. 11,093,772B2 with priority dated Jun. 11, 2019, the inventors of which are Laurence James, Stephen Borza, proposes methods to identify false biometric data in the biometric verification process. Such methods complement authentication with aspects such as user response time, depth detection in received images, comparison of other images from other cameras with database data, etc.

Among the things inseparable from a person, for the change of which under external influences, it is convenient to observe, are the eyes.

Detection of Liveliness By Corneal Observation

Patent WO2016109841A1 with priority dated Dec. 31, 2015, the inventor of which is Brian Martin, proposes methods, systems and data carriers for determining the liveliness of the face, including actions for processing the first and second images of the subject's face to determine the first and second reflections of the object from the cornea, and the first and second images of the face are captured in the first and second sequential moments of time, comparing a certain change in reflection from the cornea of an object with a known change associated with the first and second moments of time. A known change may be camera movement or a change in illumination.

Patent US20230306790A1 with priority dated Mar. 25, 2022, the inventor of which is David Hirvonen, proposes a method for determining the liveliness of an observed person, the implementation of which involves obtaining several images of two eyes of this person to extract corneal reflections from them. By analyzing these images, information is obtained about the depth of the scene in front of the object, which is determined based on the displacement between the corresponding reflections of the cornea and the change in this displacement. The analysis additionally includes the definition of a scene indicator that contains the subject's pose, the contents of the display panel of the user device, or the orientation of the user device. (Pending)

In patent US20230084760A1 with priority dated Sep. 10, 2021, the inventors of which are David Hirvonen and Spandana Vemulapalli, a method for determining human vivacity is proposed, which uses, unlike patent US20230306790A1, several cameras. A whole set of images of this person is obtained from these cameras. Each image is taken from a different angle. The parameters are determined from a set of these images. The analyzed parameters are corneal reflections of at least one object in at least one eye of the subject. (Waiting)

Patent US20230097348A1 with priority dated Sep. 24, 2021, the inventors of which are David Hirvonen and Reza R. Derakhshani, proposes a method for determining that the subject is a living person, which includes obtaining the first image taken using the first camera located on the first side of a mobile device and obtaining the second image taken using a second camera located on the opposite side of the same mobile device. The first image includes an image of reflections visible on the subject's cornea. The first image and the second image are preprocessed to create a third image and a fourth image, respectively, where the first field of view represented in the third image overlaps at least partially with the second field of view of the fourth image. Based on the third and fourth images, it turns out that the scene presented in the first field of view is essentially the same as the scene presented in the second field of view, which makes it possible to identify the subject as a living person.

The development of human gaze tracking technology has found its application in inventions related to authentication.

Detecting Liveness by Gaze Reaction

Patent WO2014184436A1 with priority dated May 14, 2014, the inventors of which are Kongqiao Wang, Wendong Wang, Bo Zhang, proposes a system and method for detecting the user's reality during the acquisition of an image containing the user's face by recognizing this face and determining whether the user's gaze moves in proximity to the place on the display screen where an object appears randomly (taking into account the time of movement and stay in this position). The object, according to the inventors' description, may be an attention- grabbing abnormal spot on a selfie image.

In U.S. Pat. No. 8,856,541B1 with priority dated Oct. 1, 2013, the inventors of which are Krishnendu Chaudhury, Avani Devarasetty, an authentication method is proposed that consists of analyzing several eye images to detect the direction of movement of the gaze following a moving element on the user's display. This method uses moving an element according to a template within the graphical user interface and comparing this direction with the direction of movement of the gaze, determined from at least two images of user's face.

Another approach to using these ideas was implemented in patents U.S. Pat. No. 10,853,677B2 and GB2560340A with priority dated Mar. 7, 2017 by inventors Sheikh Faridul Hasan, Ben Arbia Mohamed. This approach suggests a way to determine the reality (liveliness) of the user by his reaction to a moving stimulus. The model predicts the movement of a person's face (his eyes) in response to the generated stimulus. The movement of the user's face (his eyes) in response to the presented stimulus is tracked using a camera, and then by comparing the movement of the face with the forecast, it is determined whether the user is a living person (comparison of the real dynamics with the calculated one reflecting the movement of the stimulus).

A natural continuation of the development was the invention of a complex method aggregating simpler ones.

A Consolidated Approach to Detection Liveness

In patent WO2017025575A1 with priority dated Aug. 10, 2015, the inventors of which are Eleanor Simone Frederika Loughlin-Mchugh, Roman Edward Szczesniak, Francisco Angel Garcia Rodriguez, Georgios Paraskevas, Benjamin Robert Tremoulheac, Usman Mahmood Khan, a system and method implementing an integrated approach to the definition of liveliness. The system consists of a user's personal device interacting with the server using a shared secret, the origin of which is not disclosed. The method boils down to providing the user's device with the parameters of the liveliness test, which determine the reactions expected from the user, and subsequent consideration by the system of these reactions. Such tests provide for checking the motor reaction of the user's eyes to an object moving on the screen and the involuntary reaction of the eyes to flashes (in particular, the correlation of the reaction (narrowing) of the pupil to a random change in the frequency of these flashes). Accounting for the user's touch on the display while displaying one or more elements on it.

It is characteristic that in the four listed inventions using gaze movement, there is no simplest method consisting of comparing the trajectories of movement of an object highlighted on the display and the user's gaze. In the first and last of them, the direction of gaze movement is taken into account, in the second - the transition of gaze to emerging objects and the time of observation, in the third, eye movement is compared with their predicted (calculated) movement, and not with the trajectory of the stimulus.

But most importantly, all known inventions do not exclude the possibility of unfair actions of the server involved in authentication, carried out on the initiative of the administrator in charge of it. So, in the case of recording a live user reaction to control tasks submitted and verified by the server, the server can either exclude control over selected users, or, having recorded the user's reactions to verification tasks in advance (secretly excluding their unpredictability), transfer these files to front persons. At least one specification heading is required. Please delete this heading section if it is not applicable to your application. For more information regarding the headings of the specification, please see MPEP 608.01(a).

SUMMARY OF THE INVENTION

The purpose of the present invention is to authenticate individuals in a manner that makes their substitution (with other real of fake individuals) impossible. This entails preventing anyone from presenting documents or biometric data of another person, thereby posing as them. The invention ensures that it is impossible to present, instead of a live human reaction to external factors or instructions, recorded files of such reactions to instructions presented to this person in advance. To completely eliminate the substitution of a live reaction with its recording, it is necessary and sufficient to make the factors and instructions presented to the user at the time of authentication completely unpredictable. This can be achieved when such factors and instructions are generated by a randomly selected source. The present invention provides a method to achieve the stated purpose and a system for its implementation.

The cornerstone of the method is authentication in a group. Devices of group members are combined into a peer-to-peer overlay network, in which each or some of them randomly become a source for another. The source generates stimuli and instructions to be presented to a user of the addressee device. The assessment of the user's response compliance with the stimuli and instructions presented to them, as generated by a random source, is carried out by all devices within the group.

The proposed method is suitable both in the case of simultaneous mutual authentication of all participants in a forming group and in the case when a new participant joins the group.

Since one of main areas of application of the present invention is supposed to be in voting and surveys, further description will be tied to these areas.

DETAILED DESCRIPTION OF THE INVENTION

Preliminary Remarks

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It evident, however, that the present invention may be practiced without these specific details.

The present disclosure is to be considered as an exemplification of the invention, and is not intended to limit the invention to the specific embodiments description below.

DESCRIPTION OF THE INVENTION

The proposed system and method can be divided into several stages.

At the first stage, a group of users is formed, whose devices are combined into a peer- to-peer network. The user's device can be a personal computer, laptop, tablet, smartphone, etc. During the process of joining the network within its framework (within the group), a device randomly becomes a source for another device without human involvement, and each device is assigned its source.

The identification of sources and addressees can be carried out in many different ways. One way might be to use ordering through random number generation. In this method devices within a group are randomly ordered using any of the known algorithms that exclude the possibility of each of them influencing its position in this order (for example, using a hash function of the time of connection of the device to the authentication process, which the joining device records and informs others). As a result, each of the devices knows the sequential numbers of all devices in the group and believes that the sequence is cycled, that is, the first device in the group follows the last one.

Then each of the devices generates a random number (which may be within a limited range), and sends it to all devices in the group. Then each of the devices of the group, independently of the other devices, determines a random integer from the numbers it received according to the rule common for all devices of the group (according to the general formula; for example, the average of all these numbers rounded to an integer). This integer allows each device, firstly, to identify its addressee, following it and separated from it by this integer in the sequence, and secondly, to determine its source, preceding it and separated from it by the same integer.

At the next stage, each device generates an image and an algorithm for changing this image. Besides the image, each device generates an instruction for the user to perform a series of actions that can be synchronized with changes of the image and visually recognized by the device recording user response. The changing image may contain the moving object or texts. User actions may include observing the selected object on the screen and clicking with the mouse pointer at a certain place in the image or touching the touch screen at that place. Each device generate its own algorithm for the movement and transformation of the selected object on the screen of the addressee device (for example, the movement of a blue kitten among kittens of other colors) and simultaneously the instruction for the user synchronizing their actions with the image (for example, touch or click a red kitten when his collar will turn yellow). Each device saves this algorithm and this instruction.

The generation of the image and the algorithm proposed at this stage is not a mandatory element. It can be replaced by a random selection from a library of a pre-created image with an algorithm for changing this image and an instruction for the user to perform a series of actions that can be synchronized with changes of the image. The library may store a pre-planned expected reaction of the user to the images and instructions presented to them.

At the next stage, each device visualizes the algorithm for changing the image and the instructions accompanying these changes, which it receives from its source in real time or in advance. When displaying the image and presenting or sounding the instructions to the user, the device performs video recording of the user's face. During recording, the device can monitor the quality of the user's face capture and instructs the user how to point the camera correctly. During the entire recording, the device sends its source confirmation of its normal implementation. In case of interruption of such confirmation, the entire process, starting with image generation, begins from the beginning. The device sends the successfully completed video recording to all devices of its group.

After receiving a successfully completed recording from the addressee device, each source sends a message to all devices in its group containing either the algorithm and accompanying instructions it sent to its addressee, or the stored in the library expected response to the algorithm and accompanying instructions that were sent to its addressee.

At the next stage, each device, after receiving messages with video recording of the user's face from some other device, compares image of this person with a database of video or images of faces from the organizer of the vote. If it matches an image in the database, it identifies which algorithm for changing the image and instructions to the user were received from the source by the device that sent the video recording. Then each device correlates the user's involuntary reaction to the changing image presented to him, as well as the user's actions while viewing this changing image, with the expected reactions and actions prescribed by the instruction. Having established their correspondence with each other (within acceptable deviations), each device makes an individual decision on the admission of the user of the device to participate in the voting (or an internal event held in a closed group). Devices share their decisions on the admission of users with each other. As a result of the exchange of their individual decisions on the admission of a user to participate in the group's activities, a collective decision on their admission is made by a qualified majority. In accordance with this general decision, all devices of the group individually either cooperate with the user's device or refuse to cooperate with it.

The proposed method of cross-authentication makes allows to exclude the possibility of persons who are not members of a closed community from participating in the activities of this community. It can be used in any group consisting of two or more participants.

Separately, it is proposed to correlate the trajectories of the selected object and the points of fixation of the gaze of the person observing this object. In this case, trajectories are defined as shapes formed by a line representing the trace of movement of the gaze and the center of the selected object. At the same time, the trajectory of the center of the selected object can only be part of its movement and transformation, which may include turns and shape changes.

The movement of the point of fixation of the gaze is determined from the movement of the pupil in relation to those points of the face that are motionless when the eyes move. At the same time, it is necessary to take into account the fact that the pupil movement recorded by the camera includes compensation for head movement (its turns and tilts). The amount of this compensation can, for example, be determined by calculating the change in distances between several pre-selected points of the face, for example, the tip of the nose, the outer ends of the eyebrows, the corners of the lips and earlobes. When determining the desired trajectory of gaze movement, these compensatory movements should be excluded.

The invention claimed is:

1. A method to assign exactly one source to each device within a group of devices that are connected to each other through computer network to form an overlay network and perform mutual authentication within the group of devices by said each device, wherein none of the assigned exactly one source is a source for two different devices within the group of devices, the method comprising steps of:

based on group joining time of devices, creating a sequence of the devices within the group of devices, wherein the group joining time is a time when said each device of the devices joins the group of devices;

looping the sequence of the devices in a manner that a first device follows a last device within the group of devices;

based on a rule common to said each device within the group of devices, collectively generating a random integer that is not equal to a number of devices within the group of devices, wherein said collectively generating the random integer comprises:

generating, by said each device within the group of devices, a local random number;

sending, by said each device, the generated local random number to all other devices within the group of devices;

accumulating, by said each device, local random numbers from said all other devices within the group of devices, and combining, by said each device and based on the rule common to said each device within the group of devices, the accumulated local random numbers to collectively generate the random integer that is not equal to the number of devices within the group of devices;

assigning, to said each device within the group of devices, a source device that is separated in the looped sequence of the devices based on the collectively generated random integer, wherein none of the assigned source device for said each device is a source device for two different devices within the group of devices; and performing, by said each device within the group of devices, said mutual authentication with the assigned source device and said all other devices within the group of devices.

2. The method of claim 1, wherein said mutual authentication with the assigned source device and said all other devices within the group of devices, performed by said each device within the group of devices, comprising the steps of:

generating, or selecting from a library, instructions consisting of a sequence of commands for a user to perform certain actions;

sending the generated or selected from the library instructions to the devices within the group of devices;

receiving from the assigned source device the instructions;

presenting to the user the instructions received from the assigned source device;

performing video recording of face and movements of the user;

sending the video recording to the devices within the group of devices;

comparing the face and movements of the user from the video recording to determine whether the face and movements of the user match with the instructions received from the assigned source device;

making a decision on authenticity of the user whose device sent the video recording, provided that the face and movements of the user from the video recording match to the instructions that were presented to the user;

sending, to said all other devices within the group of devices, the decision on the authenticity of the user; and establishing, for said each device within the group of devices, the authenticity of the user, wherein the authenticity of the user for said each device is established at least based on decisions made by a qualified majority of devices within the group of devices.

3. The method of claim 1, wherein said mutual authentication with the assigned source device and said all other devices within the group of devices, performed by said each device within the group of devices, comprising the steps of:

generating or selecting from a library an image modification algorithm, wherein the image modification algorithm defines changes in color, intensity, and brightness for moving or stationary objects and background of the moving or stationary objects;

sending the image modification algorithm generated or selected from the library to the devices within the group of devices and receiving algorithms from the devices within the group of devices;

obtaining the image modification algorithm from the assigned source device;

visualizing the image modification algorithm obtained from the assigned source device;

performing video recording of face and eyes of the user while the user observes an image evolution on a screen;

detecting involuntary reactions of the user in the video recording;

making a decision on authenticity of the user, taking into account that the detected involuntary reactions match with changes in the image;

sending, to said all other devices within the group of devices, the decision on the authenticity of the user; and establishing, for said each device within the group of devices, the authenticity of the user, wherein the authenticity of the user for said each device is established at least based on decisions made by a qualified majority of devices within the group of devices.

4. A system comprising:

devices, each comprising a processor and a memory, connected to each other through a computer network to form an overlay network, wherein the devices are configured to perform mutual authentication and participate in a joint procedure to assign exactly one source to each device within a group of devices, so that none of the assigned exactly one source is a source for two different devices within the group of devices, by executing method steps of:

creating, within the group of devices, a sequence of the devices based on group joining time of the devices, wherein the group joining time is a time when said each device of the devices joins the group of devices;

looping the sequence of the devices in a manner that a first device follows a last device within the group of devices;

based on a rule common to said each device within the group of devices, collectively generating a random integer that is not equal to a number of devices within the group of devices, wherein said collectively generating the random integer comprises:

generating, by said each device within the group of devices, a local random number;

sending, by said each device, the generated local random number to all other devices within the group of devices;

accumulating, by said each device, local random numbers from said all other devices within the group of devices, and combining, by said each device and based on the rule common to said each device within the group of devices, the accumulated local random numbers to collectively generate the random integer that is not equal to the number of devices within the group of devices;

assigning, to said each device within the group of devices, a source device that is separated in the looped sequence of the devices based on the collectively generated random integer, wherein none of the assigned source device for said each device is a source device for two different devices within the group of devices; and performing, by said each device within the group of devices, said mutual authentication with the assigned source device and said all other devices within the group of devices.

5. The system of claim 4, wherein said mutual authentication with the assigned source device and said all other devices within the group of devices, performed by said each device within the group of devices, comprising the steps of:

generating, or selecting from a library, instructions consisting of a sequence of commands for a user to perform certain actions;

sending the generated or selected from the library instructions to the devices within the group of devices;

receiving from the assigned source device the instructions;

presenting to the user the instructions received from the assigned source device;

performing video recording of face and movements of the user;

sending the video recording to the devices within the group of devices;

comparing the face and movements of the user from the video recording to determine whether the face and movements of the user match with the instructions received from the assigned source device;

making a decision on authenticity of the user whose device sent the video recording, provided that the face and movements of the user from the video recording match to the instructions that were presented to the user;

sending, to said all other devices within the group of devices, the decision on the authenticity of the user; and establishing, for said each device within the group of devices, the authenticity of the user, wherein the authenticity of the user for said each device is established at least based on decisions made by a qualified majority of devices within the group of devices.

6. The system of claim 4, wherein said mutual authentication with the assigned source device and said all other devices within the group of devices, performed by said each device within the group of devices, comprising the steps of:

generating or selecting from a library an image modification algorithm, wherein the image modification algorithm defines changes in color, intensity, and brightness for moving or stationary objects and background of the moving or stationary objects;

sending the image modification algorithm generated or selected from the library to the devices within the group of devices and receiving algorithms from the devices within the group of devices;

obtaining the image modification algorithm from the assigned source device;

visualizing the image modification algorithm obtained from the assigned source device;

performing video recording of face and eyes of the user while the user observes an image evolution on a screen;

detecting involuntary reactions of the user in the video recording;

making a decision on authenticity of the user, taking into account that the detected involuntary reactions match with changes in the image;

sending, to said all other devices within the group of devices, the decision on the authenticity of the user; and establishing, for said each device within the group of devices, the authenticity of the user, wherein the authenticity of the user for said each device is established at least based on decisions made by a qualified majority of devices within the group of devices.

* * * * *